United States Patent [19]

Carre et al.

[11] Patent Number: 4,582,177
[45] Date of Patent: Apr. 15, 1986

[54] BRAKING DEVICE WITH MECHANICAL ACTUATION

[75] Inventors: Jean-Jacques Carre, Le Raincy; Yves Meyer, Taverny, both of France

[73] Assignee: Societe Anonyme D.B.A., Paris, France

[21] Appl. No.: 611,810

[22] Filed: May 18, 1984

[51] Int. Cl.[4] ............................................. F16D 55/08
[52] U.S. Cl. ................................. 188/72.8; 188/72.9; 188/170; 74/516
[58] Field of Search ................... 188/72.2, 72.6, 72.7, 188/72.8, 72.9, 170, 2 D; 74/501 R, 517, 516

[56] References Cited

U.S. PATENT DOCUMENTS

| 149,226 | 3/1874 | Kendall | 188/106 F |
| 3,402,792 | 9/1968 | Masser | 188/170 |
| 3,729,070 | 4/1973 | Le Marchand | 188/2 D |

FOREIGN PATENT DOCUMENTS

| 2730959 | 1/1979 | Fed. Rep. of Germany . |
| 1317919 | 12/1961 | France . |
| 1340290 | 9/1962 | France . |
| 2051260 | 4/1971 | France . |
| 2331717 | 6/1977 | France . |

*Primary Examiner*—Duane A. Reger
*Assistant Examiner*—Alvin Oberley
*Attorney, Agent, or Firm*—Ronald D. Welch; Larry J. Palguta; Ken C. Decker

[57] ABSTRACT

Braking device comprising a brake motor provided with a mechanically actuated device of the rotary type (a mechanism of the screw-and-nut type with reversible pitch) and a control jack of the "spring cylinder" type connected by a power transmission mechanism to this actuation device. According to the invention, the power transmission mechanism comprises a cam (50) keyed on the spindle of the actuation mechanism of the brake motor (10), and a cable (52) attached at one of its ends to the rod (38) of the control jack (30) and at its other end held wound round the cam, the profile of the latter being determined so as to compensate the weakening of the drive force generated by the spring of the jack during its relaxation. The invention is used especially in brake systems for heavy vehicles.

4 Claims, 8 Drawing Figures

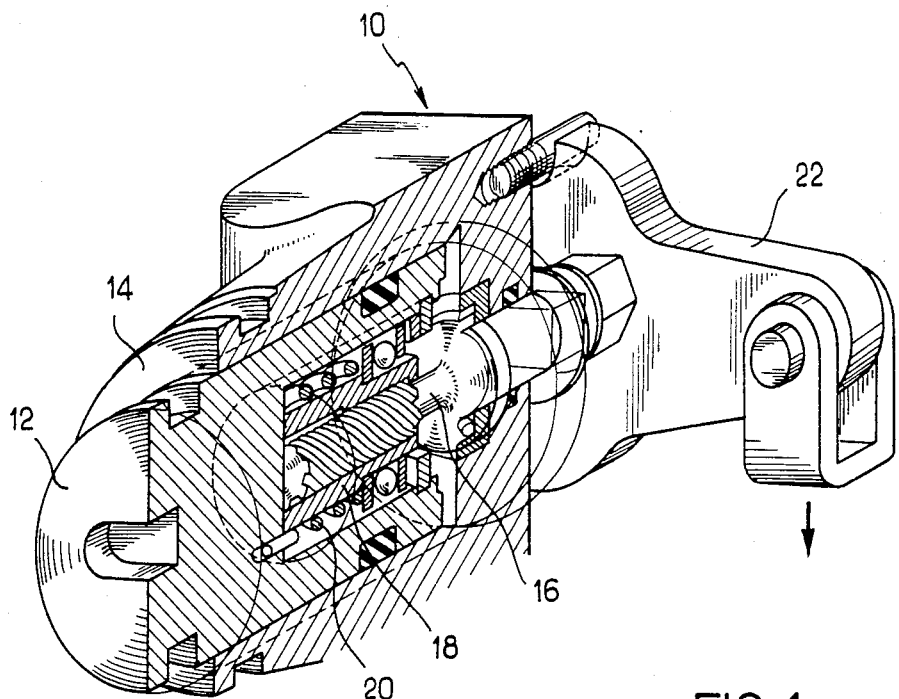
FIG_1
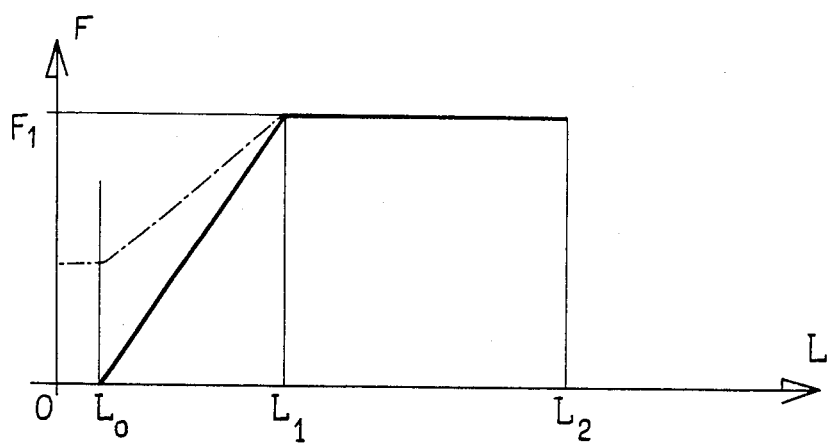
FIG_2

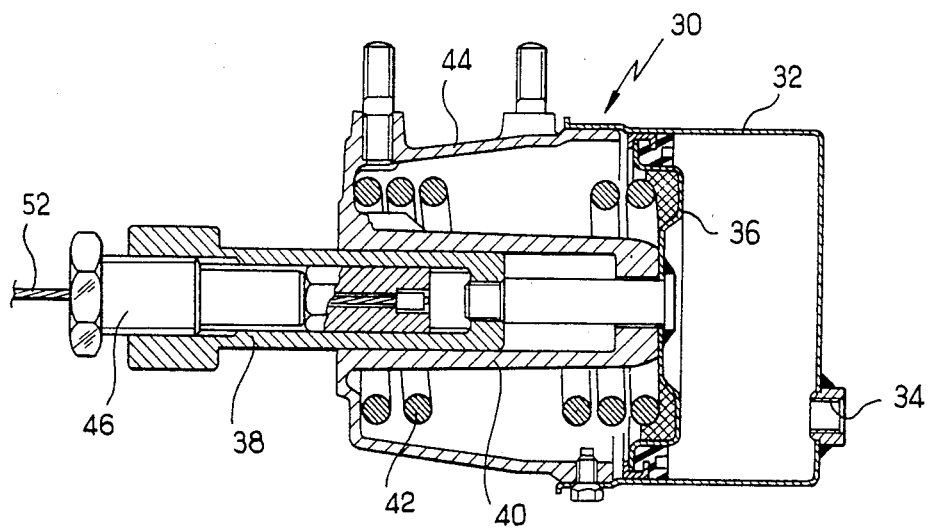
FIG_3
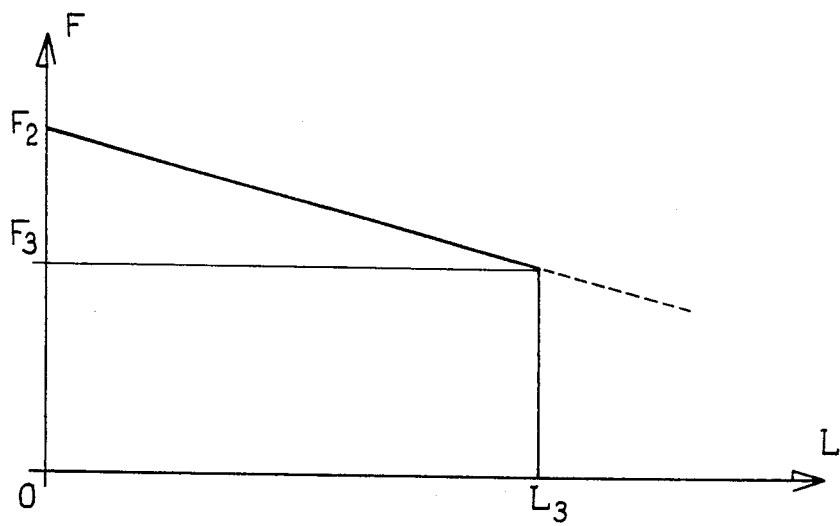
FIG_4

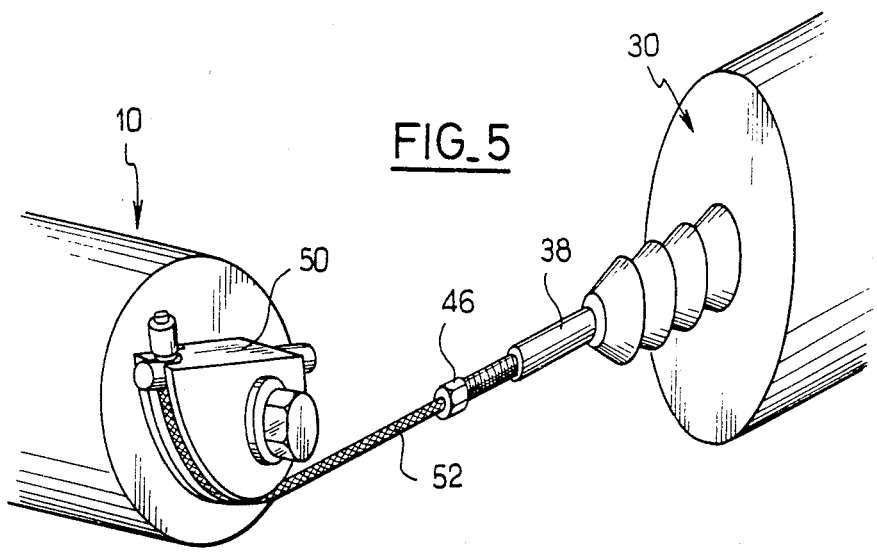
FIG_5
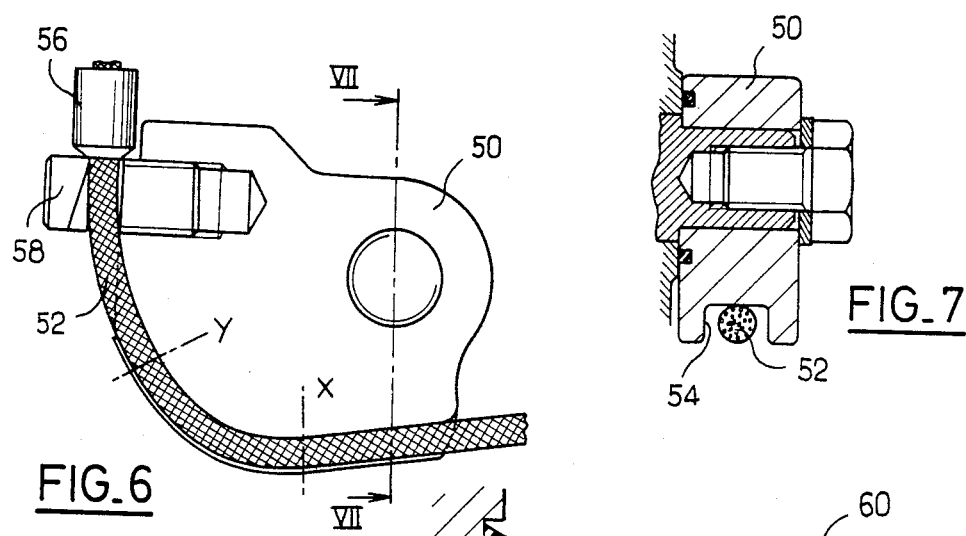
FIG_6
FIG_7
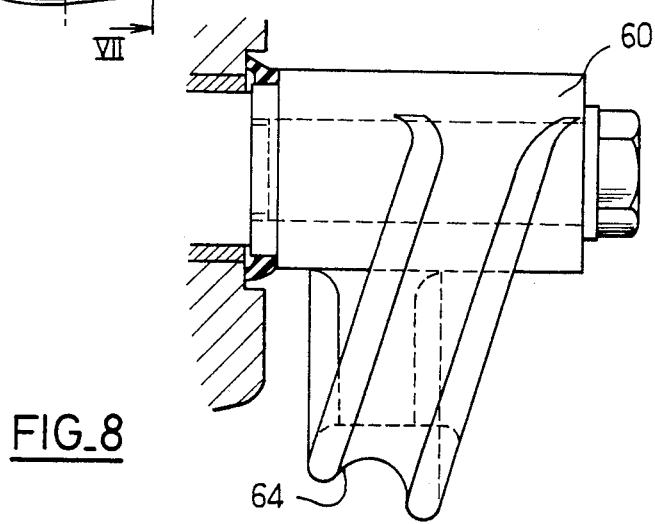
FIG_8

BRAKING DEVICE WITH MECHANICAL ACTUATION

The present invention relates to a braking device, especially for motor vehicles, comprising a brake motor provided with a mechanically actuated device of the rotary type, which preferably includes a mechanism of the screwand-nut type with a so-called reversible pitch, and a control jack connected by a power transmission means to the said actuation device.

French Pat. No. 1,340,290 illustrates a braking device of this type, in which the power transmission means, which converts the straight translational movement of the output member of the control jack into an angular movement of the screw of the mechanically actuated device of the brake motor, consists of a conventional system with a rod and crank. Even allowing for the fact that the force generated in the control jack is constant over the entire length of the stroke of the piston rod, such a braking device has the disadvantage that it exerts a variable torque on the screw of the actuation device because of the progressive modification of the effective lever arm of the crank attached to it. Furthermore, the rotation which it is possible to impart to the screw of the actuation device is limited, in practice, to an angle of 60° to 90° at most, and this can prove inadequate for some uses.

The abovementioned problem that the torque exerted on the screw of the actuation device of the brake motor is not constant becomes even more serious when the control jack used is no longer a direct action jack, but a jack of the so-called "spring cylinder" type, in which a powerful spring is normally kept compressed by a piston or another component subjected to the action of a fluid under pressure and relaxes so as to release a drive force when the action of this fluid ceases. In fact, in this type of jack which is often installed on heavy vehicles as an emergency or parking brake means, the drive force generated by the spring decreases considerably in proportion as it relaxes, whereas it would be desirable, on the contrary, to provide a constant, and indeed even an increased force in proportion as the brake is applied. This effect is added to that of the reduction in the torque exerted on the screw, which results from the progressive lessening of the lever arm of the crank, as explained above.

The object of the present invention is, therefore, to improve the performance of such a braking device, either by making the torque exerted on the rotary member of the actuation device of the brake motor independent of the stroke of the output member of the control jack or, more generally, by subjecting it to any other desired law of variation other than that arising from the weakening of the drive force of the spring during its relaxation and/or the progressive lessening of the effective lever arm of the crank.

The object of the invention is also to increase appreciably the maximum angle of rotation which it is possible to impart, in such a braking device, to the rotary member of the actuation device of the brake motor; in particular, this can make it possible to increase the clearance of the brake linings or increase the pressure exerted on these during braking by means of a reduction in the pitch of the screw of the drive mechanism.

These objects are achieved, according to the invention, and in a braking device of the type defined above, due to the fact that the power transmission means located between the brake motor and the control jack comprises a member in the form of a cam fixed to the rotary member of the mechanically actuated device of the brake motor, and a flexible transmission member (for example, a cable or chain) attached at one of its ends to the output member of the control jack and at its other end held wound round the said cam-shaped member, the profile of the latter being determined so that the torque exerted on the rotary member of the mechanically actuated device of the brake motor obeys a desired law of variation as a function of the stroke of the output member of the control jack. In most uses, the profile of the cam will be designed so as to ensure that the torque exerted on the rotary member of the actuation device is constant over at least part of the stroke of the output member of the control jack.

In a preferred embodiment, the cam-shaped member consists of a pulley sector keyed on a shaft fixed to the rotary member of the mechanically actuated device of the brake motor, this pulley sector being provided with a groove which receives the end of the flexible transmission member and the radius of which increases continuously between the point of penetration of the said member into the groove in the position of rest and the fastening point for its end. Since there is nothing to limit a priori the opening angle of the said sector, it is easy to understand that it is possible to give any desired value to the maximum angle of rotation of the rotary member of the actuation device of the brake motor, limited hitherto to some 90°; it even becomes possible, by giving the groove a helical shape, to increase this angle to more than 360°, if necessary. The invention also offers the additional advantage of allowing the actuation device of the brake motor to engage obliquely provided that a suitably inclined groove is provided for this purpose on the pulley sector.

The characteristics and advantage of the invention will emerge more clearly from the reading of the following description of a preferred embodiment given merely as an illustrative example and with reference to the attached drawings in which:

FIG. 1 shows, in a perspective view and a longitudinal section, a brake motor of a type known per se, which can be used within the scope of the present invention;

FIG. 2 is a graph illustrating the ideal law of variation in the force generated by the piston of the brake motor of FIG. 1 as a function of its stroke when the brake is actuated;

FIG. 3 shows, in a longitudinal section, a control jack of a type known per se, but which is provided with a modified output member for putting the invention into practice;

FIG. 4 is a graph illustrating the actual law of variation in the force available on the output member of the jack of FIG. 3 as a function of its stroke in proportion to the relaxation of the spring;

FIG. 5 shows, in a perspective view, a preferred embodiment of the invention;

FIG. 6 shows, in elevation and longitudinal section, the cam-shaped member used in the device according to the invention;

FIG. 7 is a cross-sectional view of the same member along the line VII—VII of FIG. 6; and FIG. 8 illustrates an alternative embodiment of the cam-shaped member of FIGS. 6 and 7.

The braking device according to the invention is composed essentially of a brake motor, such as that shown in FIG. 1 of the drawings, a control jack, such as that of FIG. 3, and a power transmission means, such as that illustrated in FIGS. 5 to 8.

The brake motor 10 of FIG. 1 has already been described by the Applicant in his French Pat. No. 1,317,919, and it is therefore necessary only to recall briefly that it is a disc-brake motor comprising both a hydraulically actuated device consisting of a piston 12 and a cylinder 14, and a mechanically actuated device which can be used, in particular, as a parking brake, this device of a rotary type including a screw 16 with a socalled reversible pitch which interacts with a sleeve or nut 18 braked in its rotation by a spring 20; when a rotary movement is imparted to the screw 16 by means of an outer actuating lever 22, the screw which is immobilised axially forces the sleeve/nut 18, itself locked against rotation, to move axially, pushing the piston 12 in the direction of the brake disc. Furthermore, the spring 20 is part of an automatic wear-compensating mechanism, as explained in the patent mentioned above.

The graph of FIG. 2 illustrates the ideal law of variation in the force F which the piston 12 ought to generate as a function of its stroke L during an operation to actuate the brake, whatever the type of device used for this purpose. From O to $L_o$, the displacement of the piston serves only to compensate the clearance of the friction linings relative to the brake disc, and no drive force is necessary, with the possible exception of the negligible force required to compensate friction. The stroke segment $L_oL_1$ corresponds to the application of presure on the linings of the disc, the desired drive force passing from O to $F_1$ during this time. Finally, any possible additional displacement of the piston, for example up to $L_2$, serves merely to compensate the progressive wear of the linings, the force which it generates being maintained at the value $F_1$.

The control jack 30 shown in FIG. 3 is of the so-called "spring cylinder" type which is often mounted on heavy vehicles as an emergency or parking brake means. It consists essentially of a cylinder 32 which an orifice 34 makes it possible to connect to a source of compressed air, a piston 36 mounted to slide within the said cylinder, an output member 38 associated with this piston and guided in its sliding action by a bearing 40, and a powerful spring 42 located between the piston and the bottom of a housing 40 which prolongs the cylinder. The drawing illustrates the device in its normal operating position: with the cylinder 32 being maintained under pressure, the piston 36 is pushed to the left up against the end of the bearing 40 and thereby compresses the spring 42, while the output member 38 projects from the housing 44 to its maximum extent. When the driver of the vehicle wishes to actuate the brake, he acts on a control member which interrupts the supply of compressed air to the cylinder 32 and bleeds it to the atmosphere: the spring 42 then relaxes, pushing the piston 36 to the right and returning to the inside of the casing 44 the output member 38 which, by a power transmission means yet to be described, transmits the drive force generated by the spring to the brake motor associated with the jack 30. In the illustration of FIG. 3, the output member 38 of the jack, which conventionally consists of a simple piston rod, is replaced by a tubular connector for anchoring the cable end, this connector itself being provided with a threaded bush 46 making it possible to adjust the tension of the cable.

The graph of FIG. 4 shows how the tractive force F picked up on the output member 38 varies as a function of its stroke L, the original position O being that shown in FIG. 3. It would be seen that, because of the progressive relaxation of the spring 42, the force decreases linearly from a value $F^2$ to a value $F_3$, this being on the assumption that the spring is still partially compressed when the output member reaches the end of its stroke (position $L_3$).

A comparison between the graphs of FIGS. 2 and 4 reveals how the characteristics of the control jack 30 fail to match the desired object of an ideal quality of braking means of the brake motor 10, since the available force is at a maximum at the moment when it could be zero, but weakens substantially when it would be desirable for it to increase. This failure of the control means to achieve the desired object becomes even worse becauseof the necessity to convert the linear tractive force available on the output member 38 of the jack into a torque exerted on the screw 16 of the brake motor, this torque being the only thing which will finally govern the thrust exerted on the piston 12 and therefore on the friction linings; in fact, the effective lever arm decreases according to a sine law in proportion to the rotation of the actuating lever 22, and this causes a corresponding reduction in the torque exerted on the screw 16, even when the tractive force is assumed to be constant.

The invention makes it possible to solve this problem by virtue of a special design of the power transmission means connecting the control jack 30 to the brake motor 10. As shown in FIG. 5 of the drawings, this power transmission means consists essentially of a cam-shaped member 50 keyed on the spindle of the screw or, more generally, of the rotary member of the actuation mechanism of the brake motor, this member replacing the actuating lever 22, and a flexible transmission member 52 consisting of the cable attached to the output member 38 of the control jack. In the embodiment illustrated, the member 50 consists of a pulley sector provided with a groove 54, in which the free end of the cable 52 is wound, and this can be anchored in a conventional way at the exit from the groove by means of a cable connector 56 and a retaining lug 58. As shown in FIG. 6, the radius at the bottom of the groove 54 increases continuously between the point of penetration of the cable 52 in the position of rest (this point then coinciding with the entrance of the groove) and the fastening point for its end at the exit of the groove. More particularly, the profile of the cam can consist of three successive sections: from the entrance of the groove to the point marked "X" in FIG. 6, the radius at the bottom of the groove is at a minimum and varies only slightly, this zone corresponding to a movement of rapid advance of the piston of the brake motor, intended to compensate the clearance of the friction linings (the segment $OL_o$ in the graph of FIG. 2); from the point "X" to the point "Y", the radius at the bottom of the groove, and therefore the lever arm of the transmission system, increase rapidly, thus making it possible not only to compensate the progressive reduction in the drive force available on the output member of the control jack, but also to increase the torque exerted on the screw of the actuation mechanism of the brake motor during the time when the piston passes through the segment $L_oL_1$ in the graph of FIG. 2; finally from the point "Y" to the exit of the groove, the increase in the radius at the bottom of the groove is less and now serves merely to compensate the progressive reduction in the drive force generated by the control jack, as a result of the relaxation of the spring, and to maintain constant the torque exerted on the screw of the actuation mechanism during the time when the piston of the brake motor engages on the segment $L_1L_2$ in the graph of FIG. 2. It thus becomes possible, because of the modulation of the lever arm of the transmission system in proportion to the unwinding of the cable, to obtain a law of variation in the brake pressure as a function of the stroke of the piston, which corresponds to the curve drawn in a dot-and-dash line in FIG. 2 and approaches to a substantial extent the ideal curve shown by an unbroken line. It must be appreciated, nevertheless, that other laws of variation could be envisaged for special uses and obtained, without departing from the scope of the invention, by designing accordingly the profile of the cam formed by the bottom of the groove 54 of the pulley sector 50.

In the exemplary embodiment illustrated in FIG. 6 of the drawings, the pulley sector 50 is designed for a maximum angle of rotation of the order of 90°, which appears sufficient for current uses. However, there is nothing, within the scope of the invention, to prevent the use, if necessary, of greater values: 180°, 270°, and indeed even a complete revolution or more. For this purpose, it is sufficient to increase accordingly the opening angle of the pulley sector or, in the latter case, replace it by a complete pulley with a slightly helical groove. The invention thus makes it possible, in uses which need it, to apply to the screw of the actuation mechanism of the brake motor rotations of an amount which is much greater than what can possibly be obtained by means of the conventional transmission systems with a rod and crank.

Likewise, while the exemplary embodiment illustrated in FIGS. 5 to 7 assumes that the axis of the control jack 30 and the transmission cable 52 are contained in a plane substantially perpendicular to the axis of the brake motor 10, the invention can also embrace a certain inclination of this plane, provided that the pulley sector is designed accordingly. FIG. 8 illustrates diagrammatically such a pulley sector 60, the groove 64 of which has, in addition to its cam-shaped profile, as described above with reference to the pulley sector 50, an inclination of approximately 20° relative to the perpendicular thus making it possible to receive and guide a cable (not shown) which would engage on the brake motor at this same angle of inclination. This additional facility offered by the invention can, in some cases, make it easier to assemble the control jack, without the need to resort to intermediate guide pulleys.

We claim:

1. A braking device for use with motor vehicles comprising a brake motor provided with a mechanically actuated parking device of the rotary type includes a rotary member operatively coupled to a mechanism of the screw-and-nut type with a reversible pitch, and a control jack of the spring-cylinder type having a linearly movable output member connected by power transmission means to the said actuation device, the jack including a spring normally pressed by a member subjected to the action of fluid pressure and which relaxes to exert a force on the said transmission means, in response to release of said fluid pressure characterized in that the power transmission means comprises a cam-shaped member fixed to the rotary member of the mechanically actuated parking device a flexible transmission member attached at one of its ends to the output member of the control jack and wound upon the periphery of said cam-shaped member, the profile of the latter being continuously curved and including a first section in which the radius of said profile increases slowly as a function of the rotation of said cam-shaped member, a second section in which said radius increases rapidly as a function of the angle of rotation of said cam-shaped member, and a third section in which said radius increases slowly as a function of the angle of rotation of said cam-shaped member to provide a force-motion relationship in which the actuating force on said rotary member is constant, increases rapidly to a maximum value and is maintained at said maximum value, respectively.

2. A braking device according to claim 1 wherein the cam-shaped member consists of the pulley sector keyed on a shaft fixed to the rotary member of the mechanically actuated device of the brake motor, said pulley sector being provided with a groove, the end of the flexible transmission member being received therein and the radius of which increases continuously between the point of penetration of the said flexible transmission member into the groove in the position of rest and the point of said groove at which it is attached to said cam-shaped member.

3. A braking device according to claim 2 characterized in that the groove has a low rate of inclination relative to the axis of the brake motor such that the opening angle thereof will reach or exceed a value of 360°.

4. A braking device according to claim 2 characterized in that the groove has a substantial rate of inclination relative to the axis of the brake motor such that the pulley sector may receive said flexible transmission member at an angle different from 90°.

* * * * *